(12) United States Patent
Kirbas et al.

(10) Patent No.: US 7,577,126 B2
(45) Date of Patent: *Aug. 18, 2009

(54) SYSTEM AND METHOD FOR OVER THE AIR AREA CODE UPDATE

(75) Inventors: Bilhan Kirbas, La Jolla, CA (US); Gowri Rajaram, Oceanside, CA (US)

(73) Assignee: Kyocera Wireless Corp., San Diego, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 11/679,151

(22) Filed: Feb. 26, 2007

(65) Prior Publication Data

US 2007/0140200 A1 Jun. 21, 2007

Related U.S. Application Data

(63) Continuation of application No. 10/665,962, filed on Sep. 18, 2003, now Pat. No. 7,184,793, which is a continuation-in-part of application No. 09/917,026, filed on Jul. 26, 2001, now Pat. No. 7,328,007, and a continuation-in-part of application No. 09/916,460, filed on Jul. 26, 2001, now Pat. No. 7,159,214, and a continuation-in-part of application No. 09/916,900, filed on Jul. 26, 2001, now Pat. No. 7,027,806.

(51) Int. Cl.
*H04Q 7/24* (2006.01)

(52) U.S. Cl. .................................... 370/338; 455/422.1

(58) Field of Classification Search ........................ None
See application file for complete search history.

(56) References Cited

U.S. PATENT DOCUMENTS 5,046,082 A 9/1991 Zicker et al.

(Continued)

FOREIGN PATENT DOCUMENTS

WO WO 98/09208 3/1998

(Continued)

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

*Primary Examiner*—Lester Kincaid
*Assistant Examiner*—Phuoc Doan

(57) ABSTRACT

Systems and methods for modifying the area code in a wireless communication device are provided that provide authorization from the carrier. The wireless communication device contains a table of valid area codes in persistent memory. The table defines the complete set of area codes that can be used by the wireless communication device. The wireless device is capable of receiving an instruction from the network that causes the current area code to be changed to a new area code from the table of valid area codes. Alternatively, the wireless device is capable of receiving an instruction from the network that causes the current table of area codes to be replaced with a new table of area codes that is received from the network along with the instruction. After installation of the new table of valid area codes, then the wireless communication device can be instructed to change from the current area code to a new area code in the new table of valid area codes.

8 Claims, 6 Drawing Sheets

U.S. PATENT DOCUMENTS

| | | | |
|---|---|---|---|
| 5,337,255 A | 8/1994 | Seidel et al. |
| 5,400,389 A | 3/1995 | Niiyama et al. |
| 5,481,706 A | 1/1996 | Peek |
| 5,507,009 A | 4/1996 | Grube et al. |
| 5,600,823 A | 2/1997 | Sherer et al. |
| 5,699,275 A | 12/1997 | Beasley et al. |
| 5,790,704 A | 8/1998 | Rao et al. |
| 5,790,856 A | 8/1998 | Lillich |
| 5,832,086 A | 11/1998 | Rosauer |
| 5,875,242 A | 2/1999 | Glaser et al. |
| 5,920,826 A | 7/1999 | Metso et al. |
| 5,930,704 A | 7/1999 | Kay |
| 5,960,356 A | 9/1999 | Alperovich et al. |
| 5,974,312 A | 10/1999 | Hayes et al. |
| 6,018,543 A | 1/2000 | Blois et al. |
| 6,023,620 A | 2/2000 | Hansson |
| 6,026,400 A | 2/2000 | Suzuki |
| 6,047,071 A | 4/2000 | Shah |
| 6,138,009 A | 10/2000 | Birgerson |
| 6,145,098 A | 11/2000 | Nouri et al. |
| 6,195,546 B1 | 2/2001 | Leung et al. |
| 6,272,333 B1 | 8/2001 | Smith |
| 6,308,061 B1 | 10/2001 | Criss et al. |
| 6,415,266 B1 | 7/2002 | Do |
| 6,442,660 B1 | 8/2002 | Heneriau et al. |
| 6,449,476 B1 | 9/2002 | Hutchinson, IV et al. |
| 6,457,174 B1 | 9/2002 | Kuroda et al. |
| 6,460,070 B1 | 10/2002 | Turek et al. |
| 6,470,447 B1 | 10/2002 | Lambert et al. |
| 6,493,549 B1 | 12/2002 | Axelson et al. |
| 6,493,871 B1 | 12/2002 | McGuire et al. |
| 6,498,789 B1 | 12/2002 | Honda |
| 6,546,492 B1 | 4/2003 | Walker et al. |
| 6,549,770 B1 | 4/2003 | Marran |
| 6,578,142 B1 | 6/2003 | Anderson et al. |
| 6,622,017 B1 | 9/2003 | Hoffman |
| 6,633,759 B1 | 10/2003 | Kobayashi |
| 6,643,506 B1 | 11/2003 | Criss et al. |
| 6,714,992 B1 | 3/2004 | Kanojia et al. |
| 6,731,946 B1 | 5/2004 | Stanwood et al. |
| 6,754,894 B1 | 6/2004 | Costello et al. |
| 6,754,895 B1 | 6/2004 | Bartel et al. |
| 6,763,252 B2 | 7/2004 | Itazawa |
| 6,785,541 B2 | 8/2004 | Martin |
| 6,950,847 B2 | 9/2005 | Harrisville-Wolff et al. |
| 6,959,192 B1 * | 10/2005 | Cannon et al. ........... 455/456.3 |
| 6,990,660 B2 | 1/2006 | Moshir et al. |
| 7,065,347 B1 | 6/2006 | Vikse et al. |
| 2001/0005861 A1 | 6/2001 | Mousseau et al. |
| 2001/0019953 A1 | 9/2001 | Furukawa et al. |
| 2001/0027500 A1 | 10/2001 | Matsunaga |
| 2001/0051519 A1 | 12/2001 | Shirai |
| 2002/0019973 A1 | 2/2002 | Hayashida |
| 2002/0026634 A1 | 2/2002 | Shaw |
| 2002/0065041 A1 | 5/2002 | Lunsford et al. |
| 2002/0072359 A1 | 6/2002 | Moles et al. |
| 2002/0077077 A1 | 6/2002 | Rezvani et al. |
| 2002/0083142 A1 | 6/2002 | Lagosanto et al. |
| 2002/0083143 A1 | 6/2002 | Cheng |
| 2002/0131397 A1 | 9/2002 | Patel et al. |
| 2002/0142762 A1 | 10/2002 | Chmaytelli et al. |
| 2002/0152268 A1 | 10/2002 | Kureshy et al. |
| 2002/0160763 A1 | 10/2002 | Mittal et al. |
| 2002/0161796 A1 | 10/2002 | Sylthe |
| 2002/0170039 A1 | 11/2002 | Kovacevic |
| 2003/0014561 A1 | 1/2003 | Cooper |
| 2003/0060189 A1 | 3/2003 | Minear et al. |
| 2004/158829 A1 | 8/2004 | Beresin et al. |
| 2004/0177072 A1 | 9/2004 | Salminen et al. |
| 2004/0214551 A1 | 10/2004 | Kim |
| 2004/0229644 A1 * | 11/2004 | Heie et al. ................. 455/551 |
| 2004/0249657 A1 | 12/2004 | Kol et al. |
| 2004/0249768 A1 | 12/2004 | Kontio et al. |
| 2004/0266422 A1 | 12/2004 | Hotze et al. |
| 2005/0064847 A1 | 3/2005 | Kirbas et al. |
| 2005/0079863 A1 | 4/2005 | Macaluso |
| 2005/0209930 A1 | 9/2005 | Coppinger et al. |

FOREIGN PATENT DOCUMENTS

| | | | |
|---|---|---|---|
| WO | WO 0067112 | 11/2000 |
| WO | WO 0135686 | 5/2001 |
| WO | WO 02/058364 A | 7/2002 |

* cited by examiner

| valid area code table | | |
|---|---|---|
| digit one | digit two | digit three |
| 1 | 1 | 1 |
| 1 | 0 | 5 |
| 2 | 1 | * |
| 5 | 0 | * |
| 8 | * | * |
FIG. 4
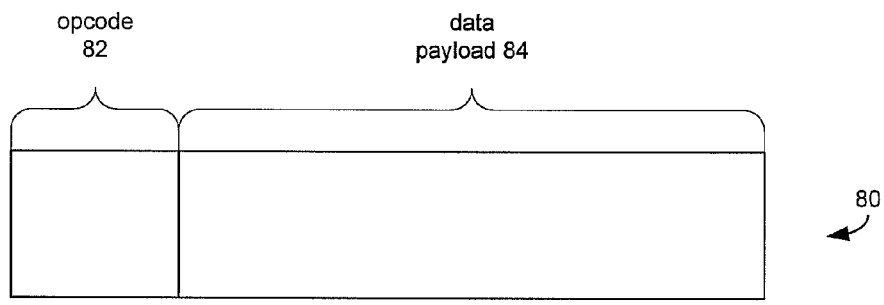
FIG. 5A
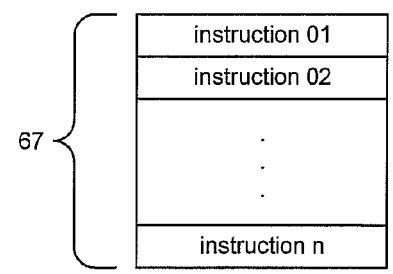
FIG. 5B

SYSTEM AND METHOD FOR OVER THE AIR AREA CODE UPDATE

RELATED APPLICATIONS

This is a continuation of U.S. application Ser. No.: 10/665,962 filed on Sep. 18, 2003, now U.S. Pat. No. 7,184,793 which is a continuation-in-part of U.S. application Ser. No. 09/917,026, filed Jul. 26, 2001; now U.S. Pat. No. 7,328,007 of U.S. application Ser. No. 09/916,460, filed Jul. 26, 2001; now U.S. Pat. No. 7,159,214 and of U.S. application Ser. No. 09/916,900, filed Jul. 26, 2001, now U.S. Pat. No. 7,027,806 the disclosures of which are hereby incorporated by reference.

FIELD OF THE INVENTION

The present invention generally relates to the field of wireless communications and more particularly relates to a secure system and method for over the air reprogramming of the area code in a wireless communication device.

BACKGROUND

The manufacture of wireless communication devices, which include any type of device that can communicate over a wireless communication network, is commonly subsidized by a network access provider such as Sprint, Verizon, AT&T Mobile, and others (also referred to herein as "carriers"). When a wireless communication device (also referred to herein as a "wireless device" "handset" or "mobile device") is manufactured, it is usually programmed and provisioned. Alternatively, a wireless communication device may be programmed and provisioned when it is activated by a carrier.

The programming and provisioning (referred to herein collectively as "programming") of a wireless communication device provides the handset with its profile. The handset profile includes its telephone number (also referred to herein as "machine identification number" or "MIN"), its area code (also referred to herein as "MIN2"), as well as other operating parameters, network parameters, and application software. These items are placed in persistent memory on the handset where they cannot be modified or deleted without authorization.

Use of a handset on a particular carrier's network can be governed by the area code that is assigned to the handset. In conventional handsets, the area code can be modified to allow the handset to be used on another carrier's network. This ability to modify a handset for use on a network other than the network of the carrier who subsidized the manufacture of the handset provides a disincentive to the carrier to subsidize and in turn drives up the cost of handsets to consumers.

Therefore, what is needed is a system and method that provides additional security in handsets against unauthorized modifications to the area code or the table of valid area codes.

SUMMARY

Conventional handsets can currently be reprogrammed in the field with fairly inexpensive software utilities and a serial connection. Such reprogramming allows these handsets that are typically subsidized by a particular carrier to be sold into the grey or black market for use with the wireless communication networks of other carriers.

Systems and methods for modifying the area code in a wireless communication device are presented that provide for authorization from the service provider (also referred to herein as the "carrier") prior to modification of the area code.

The wireless communication device contains a table of valid area codes in persistent memory. The table defines the complete set of area codes that can be used by the wireless communication device. The wireless device is capable of receiving an over the air instruction from the network that causes the current area code to be changed to a new area code from the table of valid area codes.

Alternatively, the wireless device is capable of receiving an over the air instruction from the network that causes the current table of valid area codes to be replaced with a new table of valid area codes that is provided in the data payload of the instruction. After installation of the new table of valid area codes, then the wireless communication device can be instructed to change the current area code to a new area code from the new table of valid area codes.

Additional advantages and applications of the systems and methods presented herein will become apparent after review of the detailed description.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 4 is block diagram illustrating an example valid area code table;

FIG. 5A is block diagram illustrating an example over the air area code update;

FIG. 5B is block diagram illustrating a set of example remote runtime instructions;

DETAILED DESCRIPTION

Certain embodiments as disclosed herein provide for systems and methods for bi-directional communication of dynamic instruction sets between a wireless communication device and a wireless communication network. For example, one method as disclosed herein allows for a wireless communication device to dynamically construct an instruction set and send that instruction set to the network for execution and processing.

After reading this description it will become apparent to one skilled in the art how to implement the invention in various alternative embodiments and alternative applications.

However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
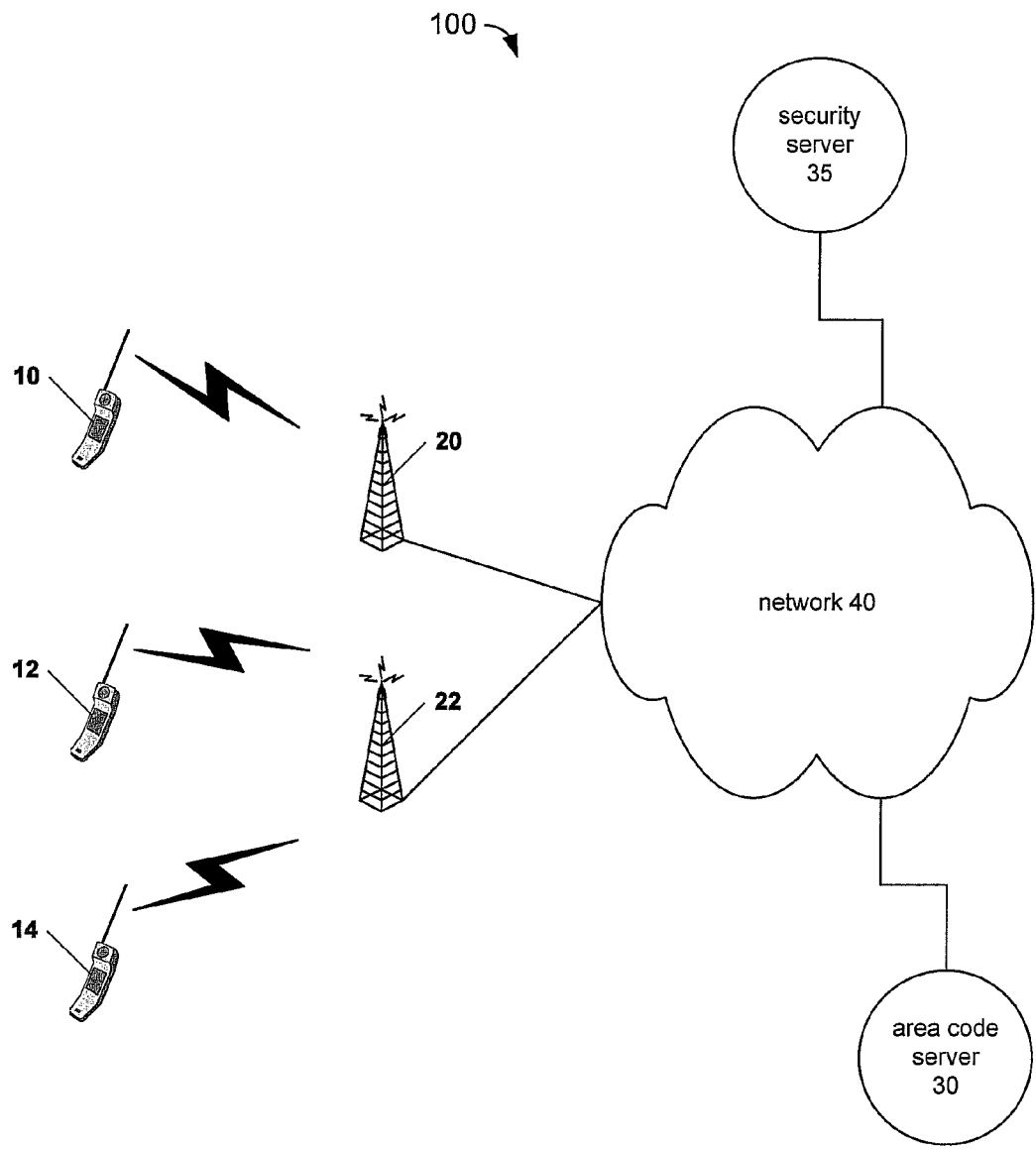
FIG. 1 is a high level network diagram illustrating an example wireless communication network for over the air area code update.

FIG. 1 is a high level network diagram illustrating an example wireless communication network 100 for over the air area code update. The illustrated wireless communication network comprises a plurality of wireless communication devices 10, 12, and 14; a plurality of base stations 20 and 22; an area code server 30; and a security server 35; each of which are connected to the wireless communication devices 10, 12, and 14 via a network 40.

Wireless communication device 10 can be any sort of device with the ability to communicate within the wireless communication network. For example, wireless communication device 10 may be a cell phone, a personal digital assistant ("PDA"), a laptop computer, pager, wristwatch, or any other device configured for wireless communication. Wireless communication devices may also be referred to herein as "handsets" or "mobile phones" or "mobile devices".

Base station 20 is preferably configured to communicate over-the-air with a plurality of wireless communication devices. Base station 20 also preferably includes a transceiver (not shown) that converts the over-the-air communications to wired communications that travel over network 40. Preferably, network 40 is a private network operated by a wireless carrier. Network 40 preferably provides the infrastructure for handoffs between base stations such as base station 20 and 22. Additionally, network 40 preferably provides the communication link between various application, services, and other computer based servers such as area code server 30 and security server 35.

Network 40 may also serve as the conduit for connections to other networks (not pictured) such as an Integrated Services Digital Network ("ISDN"), Public Switched Telephone Network ("PSTN"), Public Land Mobile Network ("PLMN"), Packet Switched Public Data Network ("PSPDN"), and the Internet, just to name a few.

Area code server 30 can be implemented as a single computer or as a plurality of computers logically arranged to provide area code and sets of area codes to mobile devices and to respond to queries and communications received from mobile devices. Similarly, security server 35 can be implemented using a general purpose computer with one or more microprocessors, as is well understood in the art. Notably, security server 35 and area code server 30 may be incorporated together on a single physical server machine where they share hardware and system resources. Security server 35 and area code server 30 may also share data files and be communicatively coupled through inter-process communication techniques or physical or wireless connections through network 40.

Figure 2:
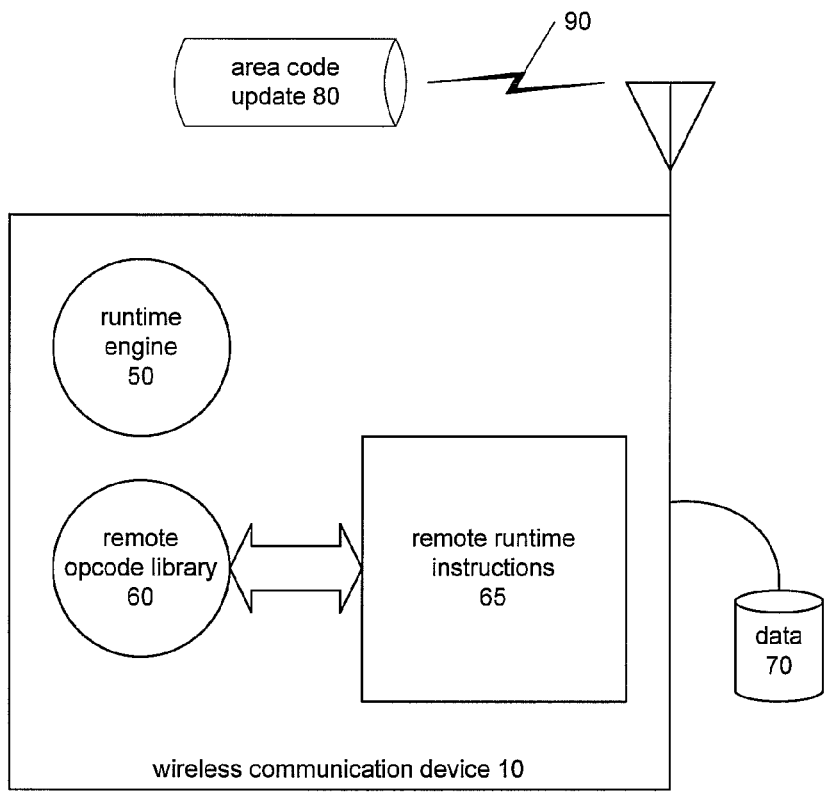
FIG. 2 is a block diagram illustrating an example wireless communication device receiving an over the air area code update.

FIG. 2 is a block diagram illustrating an example wireless communication device 10 receiving an over the air area code update 80. The general features of wireless communication device 10 that allow it to function as such are well known in the art and are therefore not illustrated or described herein. In the illustrated embodiment, the handset 10 comprises a runtime engine 50, a remote operation code ("opcode") library 60, a set of remote runtime instructions 65, a data storage area 70, and an over-the-air communication link 90 that is configured to receive the area code update 80.

A preferred method for over-the-air updating of code sections, e.g., the area code update 80, of one embodiment of the present invention is disclosed in U.S. applications Ser. No. 09/917,026, Ser. No. 09/916,460 and Ser. No. 09/916,900, the disclosures of which are incorporated herein by reference. However, other embodiments of the present invention may utilize any suitable over-the-air software updating method.

Runtime engine 50 is preferably configured to process an area code update 80 and execute the corresponding instructions set. One example of an instruction set is an area code update instruction set. Another example of a dynamic instruction set is an area code table update instruction set. The difference between these two instruction sets is that the area code update instruction set allows the handset 10 to update its current area code while the area code table update instruction set allows the handset 10 to update the table of valid area codes. Preferably, runtime engine 50 can be launched by wireless communication device 10 when needed so that it runs only when necessary and consumes a minimal amount of system resources (e.g. memory, CPU cycles, etc.) on the device 10.

Remote opcode library 60 preferably comprises operation codes that represent each area code function or area code table function. Advantageously, the operation codes in remote opcode library 60 serve as place holders for the actual executable machine code that carries out the area code update or area code table update. As such, the remote opcode library 60 contains a list of all available operation codes that correspond to each and every area code function or area code table function that can be executed by the wireless communications device 10.

Additionally, wireless communication device 10 includes a set of remote runtime instructions 65. The runtime instructions 65 include the actual machine code or executable instructions that reside in persistent memory on the device 10. Preferably, each opcode in the remote opcode library 60 corresponds with a particular set of executable instructions in runtime instructions 65. For example, a first set of instructions preferably corresponds to the opcode for an area code update and a second set of instructions preferably corresponds to the opcode for an area code table update.

Finally, in the illustrated embodiment, wireless communication device includes an over-the-air communication link 90. Implementation of the communication link 90 is well known in the art and provides the wireless communication device 10 with the ability to communicate within a wireless communication network via a radio or other over-the-air connection. Advantageously, over-the-air communication link 90 can provide the means for area code server 30 to update the data stored in data storage area 70.

Figure 3:
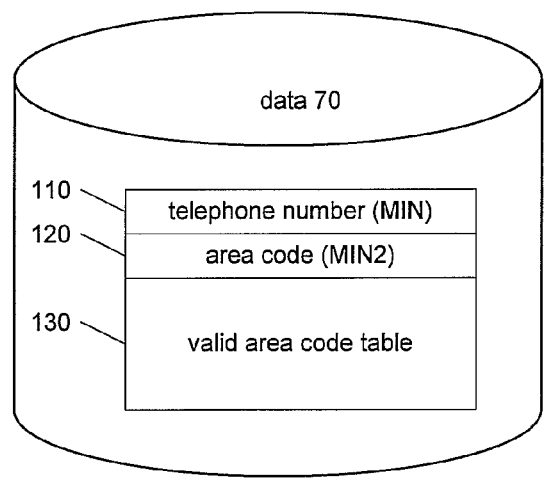
FIG. 3 is a block diagram illustrating an example data storage area in a wireless communication device.

FIG. 3 is a block diagram illustrating an example data storage area 70 in a wireless communication device (not shown). In the illustrated embodiment, the data storage area 70 comprises a telephone number 110 (also referred to as a "mobile identification number" or "MIN"), an area code 120 (also referred to as a "mobile identification number 2" or "MIN2"), and a table of valid area codes 130 (also referred to as a "MIN Lock Table"). The data storage area 70 can be implemented using various hardware components including volatile memory, persistent memory, or some combination of the two. For example, data storage area 70 may comprise a hard drive and random access memory.

Telephone number 110 is preferably a field that contains a seven digit number used to identify the particular handset. Advantageously, the telephone number 110 used in combination with the area code 120 can uniquely identify the handset on a wireless communication network. The area code 120 is preferably a three digit field. The valid area code table 130 may comprise a set of three digit area codes. Preferably, each area code in the table 130 is predetermined to be a valid area code for the particular handset. In one embodiment, the area code 120 field and the valid area code table 130 can not be edited using a direct connection to the handset and can only be modified by an over the air communication from the wireless communication network.

FIG. 4 is a block diagram illustrating an example valid area code table 130. In the illustrated embodiment, the table 130 comprises a plurality of rows, such as row 132, with each row having three columns. Preferably, each column in a row represents a single digit in an area code. Additionally, each row in the table 130 represents a discrete area code. For example, row 132 represents the area code 105. Advantageously, wildcard characters can be used in the table to represent more than one digit. For example, row 134 represents the area codes 500-509 because the asterisk (*) wildcard 136 provides for any number to be used in the last column (i.e., used for the last digit in the area code).

As shown by the ellipses 138, the table can have more than the five rows in the illustrated embodiment. Preferably, the table has thirty rows or more, with the upper limit on the number of rows set by the physical limits of the memory on the handset.

FIG. 5A is a block diagram illustrating an example over the air area code update 80. In the illustrated embodiment, the update 80 comprises an operation code 82 and a data payload 84. Preferably, the opcode 82 is a condensed identifier that instructs the handset to carry out a particular function. For example, the opcode 82 could identify an area code update function or an area code table update function.

The data payload 84 can be a fixed or variable length field that includes the data needed to carry out the particular function identified by the opcode 82. For example, in the case of an area code update function, the data payload preferably includes the new area code that is to replace the current area code in the handset. Similarly, in the case of an area code table update function, the data payload preferably includes the new area code table that is to replace the current area code table in the handset. As will be understood by one having skill in the art, a variable length data payload can be advantageous such that the area code update 80 is most efficiently sized for transport over a wireless communication network.

FIG. 5B is block diagram illustrating an example block 67 of remote runtime instructions. As shown, any number of instructions can be included in the block 67, from instruction 01 through instruction n. Preferably, the complete set of remote runtime instructions comprises a large number of blocks (such as block 67) where each block corresponds to a particular operation code. For example, block 67 preferably corresponds to the operation code that instructs the handset to update its area code. Alternatively, block 67 may correspond to the operation code that instructs the handset to update its area code table. Preferably, the block 67 consumes very little resources (e.g. persistent memory) of the device 10.

Advantageously, the remote opcode library 60, the corresponding remote runtime instruction set 65, the handset's area code and the table of area codes can be installed in persistent memory on the wireless communication device 10 during manufacture of the device 10 and prior to its deployment in the field (i.e., prior to being sold to the consumer). Future modifications to the handset's area code or table of area codes can later be provided by the area code server 30.

Figure 6:
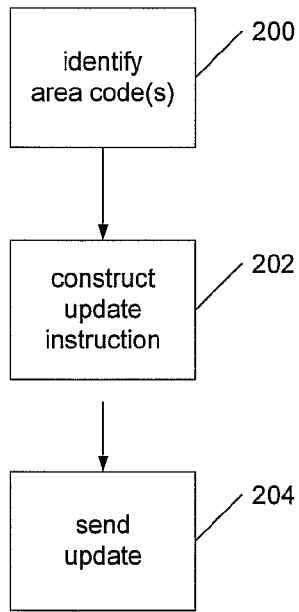
FIG. 6 is a flow diagram illustrating an example server process for updating an area code on a wireless communication device.

FIG. 6 is a flow diagram illustrating an example server process for updating an area code on a wireless communication device. Initially, in step 200 the server identifies the new area code to be assigned to the handset. Alternatively, the server may identify a set of area codes (e.g., an area code table) that needs to be provided to the handset. Once the area code or set of area codes has been identified, the server next constructs the update instruction, as illustrated in step 202.

Creating the update instruction may include determining an opcode associated with the particular update, for example an area code update or an area code table update. Additionally, creating the update may include compiling the data payload that corresponds to the opcode and combining the opcode and the data payload together into an update. Once the update has been created, the update package (including the opcode and the data payload) is sent to the handset for processing, as shown in step 204.

Figure 7:
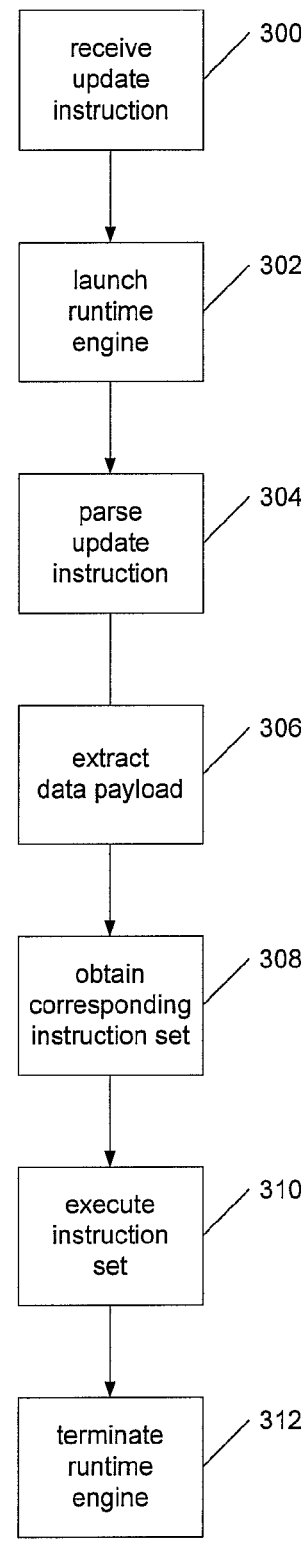
FIG. 7 is a flow diagram illustrating an example process for updating an area code on a wireless communication device.

FIG. 7 is a flow diagram illustrating an example process for updating an area code on a wireless communication device. Initially, in step 300, the wireless device receives an update instruction from the network. The update instruction is preferably received via an over the air communication link, for example a link with a wireless communication network. Preferably, the update instruction is optimized to minimize the amount of data sent over the air. In one embodiment, the update instruction comprises an opcode and a data payload.

In step 302, the wireless device launches its runtime engine to process the update instruction. As illustrated in step 304, the runtime engine parses the update instruction to identify the opcode and the data payload. In step 306, the runtime engine extracts the data payload. If no data payload exists, then this step can be skipped. If a data payload does exist, then the resulting data can be stored in an available portion of volatile memory for later use. Next, the runtime engine obtains the executable instructions that correspond to the opcode in the update instruction as shown in step 308. These instructions can be obtained from the remote runtime instructions in the wireless device.

Once the executable instructions corresponding to the opcode in the update instruction have been obtained, the runtime engine executes the instructions, as illustrated in step 310. When the instructions are being executed, any necessary data to be operated on can be obtained from volatile memory where the data payload is stored. Alternatively, or additionally, any necessary data to be operated on may be obtained as the result of an executed instruction.

For example, the data payload may include an updated area code table for the wireless device. Additionally, the opcode in the update instruction may correspond to a set of executable instructions for replacing the current area code table with the new area code table. In this example, the current area code table is being replaced and as a result the new area code table is loaded into persistent memory by the set of instructions. Thus, the update instruction comprising the opcode and data payload operate on the wireless device to update the area code table.

Similarly, the update instruction may operate to update only the area code. In such a case, the set of instructions corresponding to the opcode preferably include steps for matching the new area code (received in the data payload) with the set of valid area codes in the area code table. When the new area code is included in the valid area code table, then the area code update is performed. On the other hand, when the new area code is not included in the valid area code table, then the area code update preferably fails.

Once the update instruction has been executed in its entirety by the runtime engine, the runtime engine can be terminated, as shown in step 312. Advantageously, the runtime engine may be launched and terminated so that it runs only when necessary. This saves system resources on the wireless device, for example it may save volatile memory space and CPU cycles.

Figure 8:
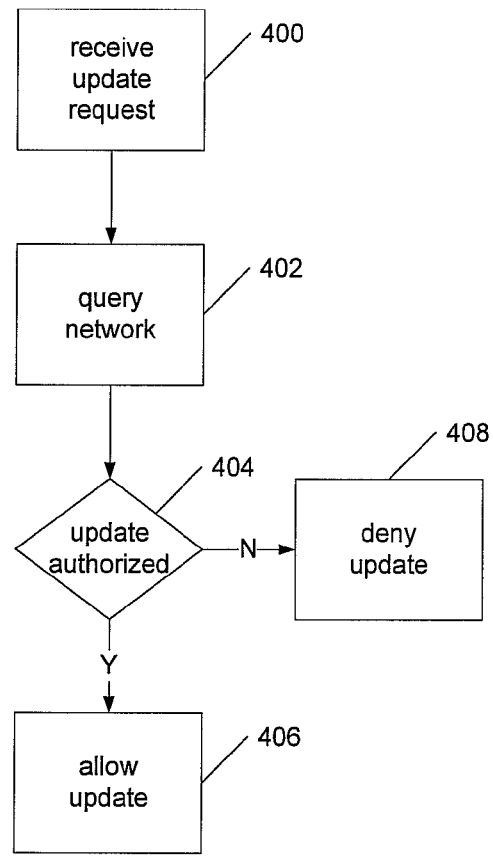
FIG. 8 is a flow diagram illustrating an example process for carrier authorization of updating an area code on a wireless communication device.

FIG. 8 is a flow diagram illustrating an example process for carrier authorization of updating an area code on a wireless communication device according to an embodiment of the present invention. Initially, in step 400, the handset receives an update request, for example, from a reprogramming device that is not part of the wireless communication network. Such a request may also be an update instruction. The reprogramming device may be connected to the handsets via a local network connection or a serial cable connection that allows the reprogramming device.

Once the handset receives the update request, the handset sends a query to the carrier via a wireless communication means, as shown in step 402. This request is sent to determine if the area code update on the handset is authorized by the carrier. When the handset receives a response from the carrier via the same wireless communication means, the handset determines if the area code update is authorized, as shown in step 404. If the area code update is authorized, in step 406 the handset allows the area code update, for example by allowing the current area code to up modified or by allowing the area code table to be modified or replaced.

If the area code update is not authorized, the handset denies the request, as illustrated in step 408. Advantageously, the carrier can log the request. Additionally, the carrier can query the handset for location information such as GPS in order to determine the location where the reprogramming attempt was made. This information may be helpful if the reprogramming attempt was unauthorized.

Figure 9:
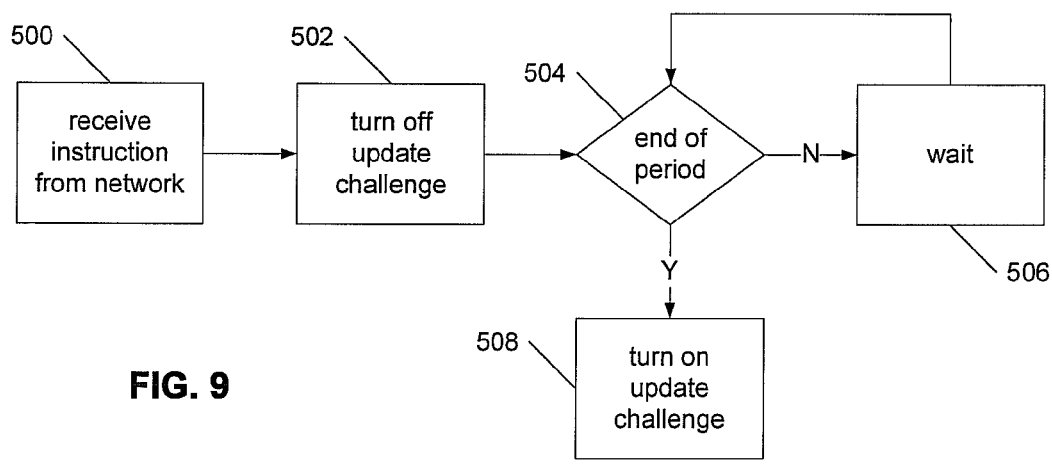
FIG. 9 is a flow diagram illustrating an example process for creating an authorization free area code updating window on a wireless communication device.

FIG. 9 is a flow diagram illustrating an example process for creating an authorization free area code updating window on a wireless communication device. In an embodiment where a carrier has a large stock of phones that need to be updated, for example the area code table needs to be updated, the carrier may opt to turn off the area code update security procedures for a predetermined interval of time. For example, a 6 hour window may be created to allow a carrier to update the area code table on a large number of handsets.

Initially, the carrier sends out an instruction to a group of handsets, or alternatively a single handset. Such an instruction can be delivered by the area code server using the previously described area code update instruction comprising an opcode and a data payload. In step 500, the handset receives the update instruction from the carrier. The update instruction tells the handset to turn off the area code update security procedures during a specific window of time. For example, the window of time may be included in the data payload of the update instruction. The update instruction may alternatively tell the handset to turn off the area code update security procedures indefinitely. Alternatively, the update instruction may tell the handset to turn on the area code update security procedures. In this case, the instruction tells the handset to turn off the area code update security procedures for a six (6) hour window.

In step 502, the handset turns off the area code update security features. The handset then periodically checks to see if the end of the predetermined period has been reached, as illustrated in step 504. If the period is still in effect, the handset continues to wait, as shown in step 506. The waiting period between each check may be set at a small interval, a large interval, or a variable interval determined by how recently the area code update security features were suspended. When the waiting period is over, in step 508 the handset turns the update challenge on.

In the case where the area code update security features are turned off indefinitely, the handset preferably suspends the area code update security features until a corresponding instruction is received from the network, the corresponding instruction serving to turn the area code update security features back on.

Figure 10:
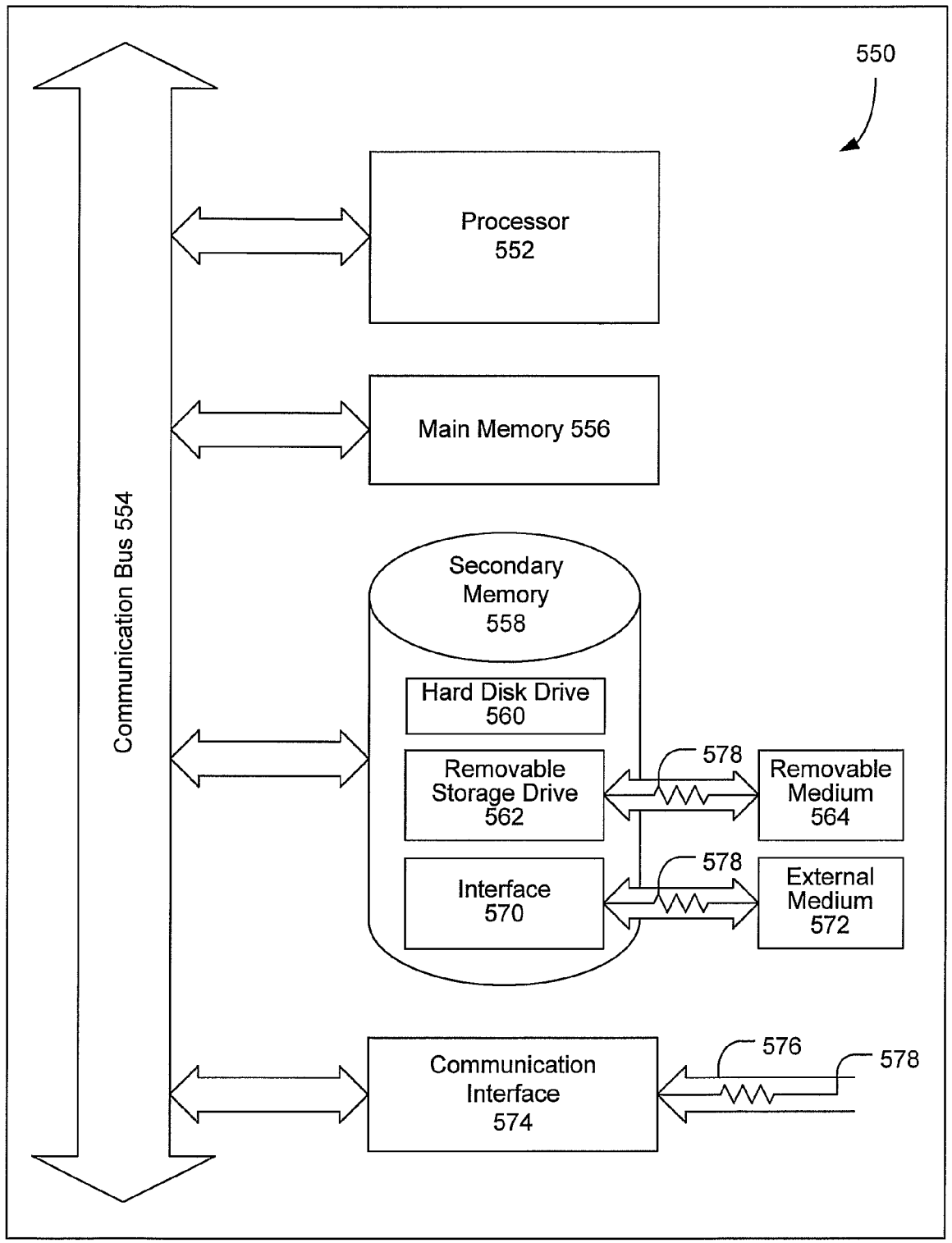
FIG. 10 is a block diagram illustrating an exemplary computer system that may be used in connection with various embodiments described herein.

FIG. 10 is a block diagram illustrating an exemplary computer system 550 that may be used in connection with the various examples described herein. For example, the computer system 550 may be employed as the are code server that resides within the wireless communication network. Computer system 550 may also be employed as any of the various other general or specific purpose computer systems that comprise the wireless communication network and its constituent components. However, other computer systems and architectures may be used, as will be clear to those skilled in the art.

The computer system 550 preferably includes one or more processors, such as processor 552. Additional processors may be provided, such as an auxiliary processor to manage input and output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions as previously described.

In this description, the term "computer readable medium" is used to refer to any media used to provide computer executable code (e.g., software and computer programs) to the computer system 550 or a wireless communication device (not shown). Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various examples may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various examples may also be implemented using a combination of both hardware and software.

While the particular systems and methods herein shown and described in detail are fully capable of attaining the above described objects of the invention, it is to be understood that the description and drawings presented herein are representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for wirelessly updating a set of area codes stored on a wireless communication device, wherein the wireless communication device is communicatively coupled with a wireless communication network, comprising:

identifying a new area code for the wireless communication device, wherein the identifying of the new area code is performed without human intervention, the new area code comprising a portion of a unique identifier of the wireless communication device on the wireless communication network;

constructing an update communication, wherein the update communication is constructed without human intervention, the update communication comprising at least one operation code and a data payload, wherein the at least one operation code comprises at least one of a new area code operation code and a new area code table operation code, wherein the data payload comprises at least one of the new area code and a new area code table; and sending the update communication to the wireless communication device via the wireless communication network to update an area code portion of the unique identifier of the wireless communication device, wherein the update communication is sent without human intervention.

2. The method of claim 1, wherein the new area code is identified from a set of valid area codes.

3. The method of claim 1, wherein the update communication further comprises an operation code instructing the wireless communication device to update the set of area codes.

4. The method of claim 3, further comprising at the wireless communication device after receiving the update communication:

requesting authorization from an authorization server;
receiving authorization from the authorization server in response to the request; and
executing the update communication.

5. A method for wirelessly updating an area code information stored on a wireless communication device, wherein the wireless communication device is communicatively coupled with a wireless communication network, the method comprising:
receiving, at the wireless communication device, an update communication from a network server of the wireless communication network to the wireless communication device, the update communication comprising at least one operation code and a data payload, wherein the at least one operation code comprises at least one of a new area code operation code and a new area code table operation code, wherein the data payload comprises at least one of a new area code and a new area code table;
extracting the at least one operation code and the data payload from the update communication utilizing a runtime engine of the wireless communication device;
the runtime engine corresponding the extracted at least one operation code to a first set of runtime instructions stored in the wireless communication device if the extracted at least one operation code is the new area code operation code; the runtime engine corresponding the extracted at least one operation code to a second set of runtime instructions stored in the wireless communication device if the extracted at least one operation code is the new area code table operation code;
executing the first set of runtime instructions utilizing the runtime engine if the extracted at least one operation code is the new area code operation code; and
executing the second set of runtime instructions utilizing the runtime engine if the extracted at least one operation code is the new area code table operation code.

6. The method of claim 5, further comprising:
the wireless communication device requesting authorization from the network server to proceed with the execution of the at least one operation code;
receiving authorization from the network server in response to the requested authorization; and
executing the at least one operation code.

7. The method of claim 5, wherein executing the first set of runtime instructions comprises storing the new area code in the wireless communication device; and
wherein executing the second set of runtime instructions comprises storing the new area code table in the wireless communication device.

8. The method of claim 5, further comprising:
the network server identifying a required update of an existing area code of the wireless communication device to the new area code, wherein the existing area code comprises a portion of a unique identifier of the wireless communication device on the wireless communication network;
wherein executing the first set of runtime instructions comprises updating the unique identifier of the wireless communication device.

\* \* \* \* \*